Oct. 20, 1953  J. F. NELSON  2,655,719
PISTON RING COMPRESSOR
Filed May 2, 1950  2 Sheets-Sheet 1
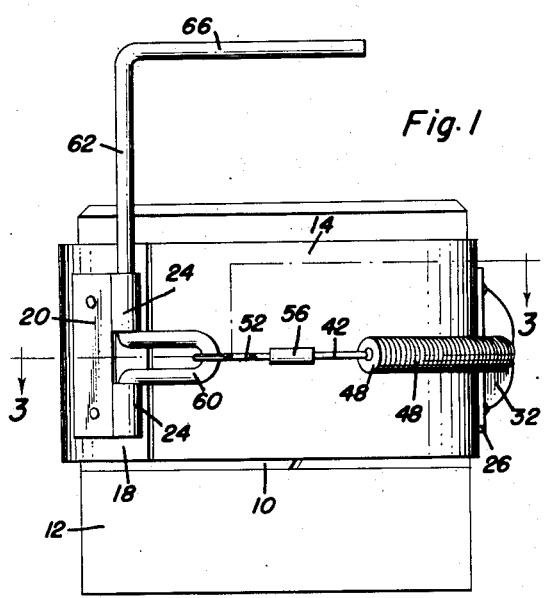
Fig. 1
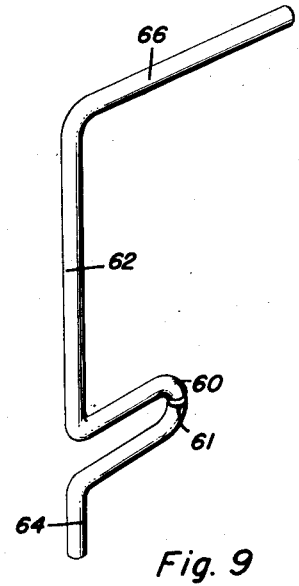
Fig. 9
Fig. 2
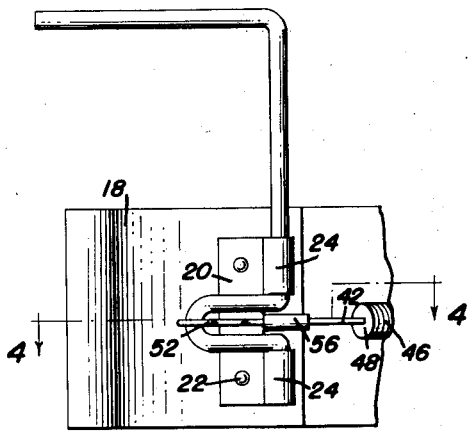
Fig. 10
Fig. 11
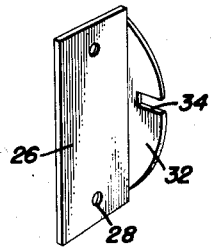
John F. Nelson
INVENTOR.
BY
Attorneys Oct. 20, 1953   J. F. NELSON   2,655,719
PISTON RING COMPRESSOR Filed May 2, 1950   2 Sheets-Sheet 2

John F. Nelson
INVENTOR.

BY
Attorneys

Patented Oct. 20, 1953

2,655,719

UNITED STATES PATENT OFFICE 2,655,719

PISTON RING COMPRESSOR

John F. Nelson, Oregon City, Oreg.

Application May 2, 1950, Serial No. 159,505

2 Claims. (Cl. 29—222)

This invention comprises novel and useful improvements in a piston ring compressor and more specifically pertains to a clamp or compressor for contracting piston rings in order to facilitate the insertion of a piston in a cylinder block in accordance with known practice.

The principal object of this invention is to provide an improved piston ring compressor which shall be of a very simple but effective construction, of light weight inexpensive fabrication, easily applied to or removed from a piston and piston ring assembly, and may be readily manipulated and adjusted to contract different sizes of rings.

A still further object of the invention is to provide a piston ring compressor as set forth in the preceding objects, which shall embody a flexible band having overlapping relatively slidable ends, this band adapted to encircle and compress a piston ring or a plurality of piston rings during contraction of the band, in conjunction with novel and highly effective means for adjustably contracting the flexible band.

These, together with various ancillary objects and features of the invention, which will later become apparent as the following description proceeds, are attained by the present invention, a preferred embodiment of which has been illustrated, by way of example only, in the accompanying drawings, wherein:

Figure 1 is a side elevational view showing a piston ring compressor embodying the principles of this invention, the same being shown applied to a piston and piston ring assembly for compressing the rings, the device being shown in its released or non-contracted position;

Figure 2 is a fragmentary side elevational view of a portion of the ring compressor, the device being shown in its fully compressed and locked position;

Figure 9 is a perspective view of the contracting crank of the compressing member;

Figure 10 is a perspective view of the adjustable mounting bracket of Figures 5 and 6; and, Figure 11 is a fragmentary sectional view showing the construction of the flexible contracting member.

Referring now more specifically to the accompanying drawings, wherein like numerals designate similar parts throughout the various views, attention is directed to Figure 1 showing the manner in which the present invention is applied for the purpose of contracting the piston rings, one of which is shown at 10, upon a piston body 12 in order that the piston and ring assembly may be easily inserted in a cylinder bore in internal combustion or like engine.

Figure 3:
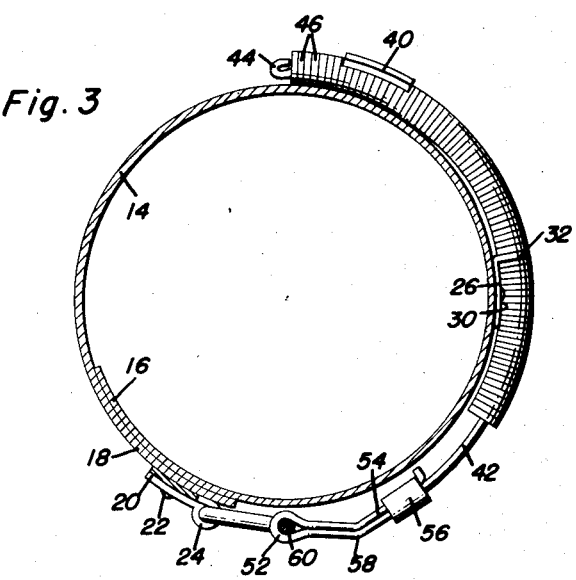
Figure 3 is a horizontal sectional view taken substantially upon the plane indicated by the section line 3—3 of Figure 1 of the ring compressor itself, showing the same in its unlocked or non-contracted position.
Figure 4:
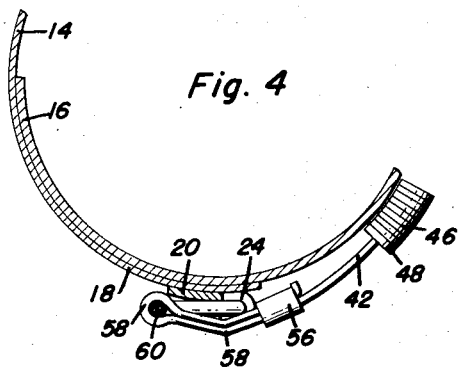
Figure 4 is a fragmentary view similar to Figure 3 but showing the relative positions of the parts in the contracted and locked position of the device taken substantially upon the plane indicated by the broken section line 4—4 of Figure 2.

The ring compressible and contracting device forming the subject of this invention, consists of a flexible band of sheet metal or similar material, this band being indicated by the numeral 14 and having overlapping inner and outer extremities or ends 16 and 18 respectively, as shown in Figures 3 and 4. In operation, the overlapping relatively slidable ends 16 and 18 and the entire band are placed about the piston rings, and upon contraction of the band 14, the piston rings are compressed into the piston ring grooves so as to leave the exterior surface of the piston 12 flush throughout its length whereby the piston may be tapped or driven into the cylinder bore, not shown.

Figure 5:
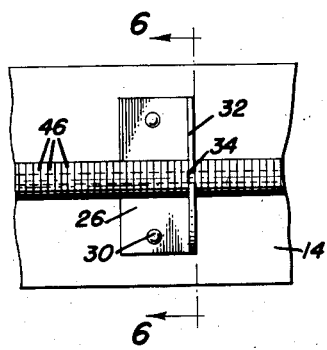
Figure 5 is a fragmentary side elevational view showing a portion of the cooperating structure by means of which the band contracting member may be adjustably secured to the flexible band of the compressor.
Figure 6:
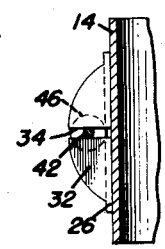
Figure 6 is a vertical transverse sectional view taken substantially upon the plane indicated by the section line 6—6 of Figure 5.

In order to control the expansion and contraction of the flexible band, a novel and effective mechanism in accordance with this invention is provided. This mechanism includes a hinge bracket 20 which is secured to one end 18 of the flexible band as by rivets or the like 22 or any other desired manner, this hinge bracket including aligned, transversely disposed cylinders or eyes 24 for rotatably receiving a locking lever as set forth hereinafter. At a suitable distance from the other end 16 of the band 14, there is provided a mounting bracket fixedly secured thereto. This mounting bracket, as shown in Figures 5, 6 and 10, includes a base plate 26, having apertures 28 by means of which the plate may be fixedly secured to the band as by rivets or the like, as shown at 30 in Figure 5, this mounting bracket having an upstanding or outwardly extending lug or ear 32 having a notched portion 34. Likewise secured in any desired manner to the exterior surface of the band 14 in any convenient place thereon, is a resilient clip, the same including a portion or base 36 suitably attached to the band 14, the portion 36 having an arcuate portion 38, with a curved lip 40.

The novel band contracting member forming a very important feature of this invention, consists of a cable 42 such as a wire or the like of any desired construction and material, and which has an enlargement 44 at one end thereof whereby a plurality of spacing members 46 may be retained on the cable 42. As illustrated, these spacing members consist of flat washers rotatably received upon the cable 42, between the enlargement 44 at one end of the cable, and an end washer 48, see Figure 11, which is welded or otherwise secured as at 50 to the cable 42. Although the invention has been illustrated as including flat washers, it is evident that other suitable spacing members such as sleeves, bushings or the like of circular cross section or any other desired cross section may be received upon the member 42. In any event, only a very limited longitudinal movement of the spacing members with respect to each other is permitted, while the members are free to rotate upon the cable as desired.

At its forward end, the cable 42 is folded upon itself to provide a loop or eye 52, the folded end of the cable 54 being attached to the cable proper 42 as by a sleeve or tubular member 56 compressively clamped thereon. The folded portion of the cable, is angulated or bent as at 58 so that the mid portion of the folded part is bent outwardly a greater distance from the flexible band 14 than the two ends of the folded portion, as will be readily apparent from Figures 3 and 4.

The loop portion 52 of the cable, embraces and is received upon a crank throw 60 being rotatably retained in an annular groove 61, said throw being formed in a rod 62 whose extremities 64 and mid portion are journaled in the above mentioned hinge cylinders or eyes 24 as illustrated in Figures 1 and 2.

The groove 61 constitutes a guide or retaining means for holding the loop 52 in proper position at the mid portion of the crank throw 60.

The upwardly extending portion of the rod 62 is laterally positioned as at 66 to provide a handle by means of which the locking lever may be rotated.

Figure 7:
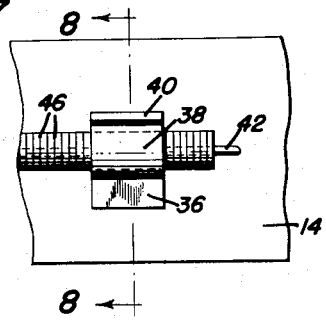
Figure 7 is a fragmentary side elevational view showing structural details of the means by which the ends of the flexible contracting member is resiliently secured against the flexible band.
Figure 8:
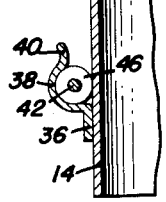
Figure 8 is a vertical transverse sectional detail view taken substantially upon the plane indicated by the section line 8—8 of Figure 7.

The contracting member is adjustably secured to the mounting bracket of the flexible band by merely inserting the ear 32 of the bracket between any two adjacent spacing members 46, with the cable 42 being received within the notch 34. The end of the flexible contracting member is resiliently clamped or engaged in the clip in the manner shown in Figures 7 and 8, and in Figure 3, whereby the same will be maintained out of the way during use of the device, and will also serve to hold the contracting member seated in the mounting bracket.

With the contracting member properly placed as above mentioned, it is evident that rotation of the locking lever will serve to cause contraction or expansion of the flexible band to perform its intended operation.

It will be further seen that the locking action is greatly facilitated by the angulated or offset portion 58, which thus provides proper clearance for the crank portion of the locking lever as will be apparent from Figure 4.

From the foregoing, the construction and operation of the device together with its many advantages will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A piston ring compressor comprising a flexible band having overlapping relatively slidable ends, a band contracting member, means adjustably attaching said member to one portion of said band, a locking lever pivoted to another portion of said band and connected with said member for tensioning and locking the same in adjustably tensioned position, said band contracting member comprising a cable having a plurality of disks loosely mounted on the cable, an end one of said plurality of disks being longitudinally fixed on said cable, means preventing the other end disk of said disks from moving beyond a point on said cable, said adjusting means comprising a bracket mounted on said band, a notched ear on said bracket receiving said cable in its notch and selectively insertable between adjacent disks, said loosely mounted disks being movable apart on said cable to permit the notched ear of the bracket to enter between the disks.

2. The combination of claim 1 wherein said cable has one end provided with a loop portion, said loop portion being angulated, said locking lever having a crank arm pivoted to said loop portion.

JOHN F. NELSON.

References Cited in the file of this patent

UNITED STATES PATENTS

| Number | Name | Date |
|---|---|---|
| 1,103,717 | Walton et al. | July 14, 1914 |
| 1,432,138 | Thomson | Oct. 17, 1922 |

FOREIGN PATENTS

| Number | Country | Date |
|---|---|---|
| 326,200 | Germany | Sept. 25, 1920 |
| 162,212 | Great Britain | Apr. 28, 1921 |